US012409483B2

(12) United States Patent
Opitz et al.

(10) Patent No.: US 12,409,483 B2
(45) Date of Patent: Sep. 9, 2025

(54) COOLING SECTION WITH VALVES AND PRESSURE VESSELS FOR PREVENTING PRESSURE SHOCKS

(71) Applicant: Primetals Technologies Germany GmbH, Erlangen (DE)

(72) Inventors: Erich Opitz, Linz (AT); Lukas Pichler, Linz (AT); Florian Poeschl, Linz (AT); Alois Seilinger, Linz (AT); Klaus Weinzierl, Nuremberg (DE)

(73) Assignee: PRIMETALS TECHNOLOGIES GERMANY GMBH (DE)

( * ) Notice: Subject to any disclaimer, the term of this patent is extended or adjusted under 35 U.S.C. 154(b) by 408 days.

(21) Appl. No.: 17/623,923

(22) PCT Filed: Jun. 18, 2020

(86) PCT No.: PCT/EP2020/066970
§ 371 (c)(1),
(2) Date: Dec. 30, 2021

(87) PCT Pub. No.: WO2021/001162
PCT Pub. Date: Jan. 7, 2021

(65) Prior Publication Data

US 2022/0362823 A1 Nov. 17, 2022

(30) Foreign Application Priority Data

Jul. 3, 2019 (EP) .................................... 19184168

(51) Int. Cl.
*B21B 45/02* (2006.01)
*B05B 1/30* (2006.01)

(52) U.S. Cl.
CPC ............ *B21B 45/0224* (2013.01); *B05B 1/30* (2013.01)

(58) Field of Classification Search
CPC .............................. B21B 45/0224; B05B 1/30
(Continued)

(56) References Cited

U.S. PATENT DOCUMENTS 4,949,656 A * 8/1990 Lyle ....................... A01C 7/004 111/900
10,076,778 B2 9/2018 Chen et al.
(Continued)

FOREIGN PATENT DOCUMENTS

CN 204503780 U 7/2015
EP 2 644 718 A1 10/2013
(Continued)

OTHER PUBLICATIONS

Russian Federation Decision to Grant, dated Oct. 27, 2022, issued in corresponding Russian Patent Application No. 2022101539/05(003193). English translation.
(Continued)

*Primary Examiner* — Christopher S Kim
(74) *Attorney, Agent, or Firm* — OSTROLENK FABER LLP

(57) ABSTRACT

A device for cooling a metal rolling stock (1) rolled in a rolling train, having multiple cooling devices (4), to which water (5) is supplied via a respective branch line (7) and by means of which the water (5) is applied to the rolling stock (1). The branch lines (7) are equipped with a respective valve (8), by means of which the water flow flowing through the respective branch line (7) is adjusted. Each of the valves (8) is paired with a drive (9), via which the respective valve (8) is actuated. The cooling devices (4) form multiple groups, each of which is paired with a dedicated pressure vessel (10) in a proprietary manner. Each pressure vessel (10) is connected to a respective feed line (12) at a respective connection point (11), and the water (5) is supplied to the
(Continued)

branch lines (7) of the cooling devices (4) of the corresponding group via said feed line. When viewed in the flow direction of the water (5), each connection point (11) is arranged upstream of the valves (8) of the respective group of cooling devices (4).

5 Claims, 3 Drawing Sheets

(58) Field of Classification Search
USPC .......................... 239/302, 443, 444, 445, 446
See application file for complete search history.

(56) References Cited

U.S. PATENT DOCUMENTS

| | | | | |
|---|---|---|---|---|
| 2014/0131469 | A1* | 5/2014 | Henry | A01C 23/007 239/176 |
| 2015/0053272 | A1 | 2/2015 | Weinzierl | 137/14 |
| 2015/0328670 | A1 | 11/2015 | Alken et al. | |

FOREIGN PATENT DOCUMENTS

| | | | |
|---|---|---|---|
| EP | 2 767 353 | A1 | 8/2014 |
| JP | H01-186210 | A | 7/1989 |
| JP | 2015-526297 | A | 9/2015 |
| SU | 1107922 | A1 | 8/1984 |
| SU | 1411070 | A1 | 7/1988 |
| WO | WO 2013/143902 | A1 | 10/2013 |
| WO | WO 2014/032838 | A1 | 3/2014 |
| WO | WO 2018/080669 | A1 | 5/2018 |

OTHER PUBLICATIONS

Chinese Office Action, dated Mar. 4, 2023, issued in corresponding Chinese Patent Application No. 202080048919.1 with English translation of Search Report.
International Search Report mailed Oct. 6, 2020 in corresponding PCT International Application No. PCT/EP2020/066970.
Written Opinion mailed Oct. 6, 2020 in corresponding PCT International Application No. PCT/EP2020/066970.
European Search Report mailed Dec. 19, 2019 in corresponding European Patent Application No. 19184168.3.

* cited by examiner

PRIOR ART

COOLING SECTION WITH VALVES AND PRESSURE VESSELS FOR PREVENTING PRESSURE SHOCKS

CROSS-REFERENCE TO RELATED APPLICATIONS

The present application is a 35 U.S.C. §§ 371 national phase conversion of PCT/EP2020/066970, filed Jun. 18, 2020, the contents of which are incorporated herein by reference, which claims priority of European Patent Application No. 19184168.3 filed Jul. 3, 2019, the contents of which are incorporated by reference herein. The PCT International Application was published in the German language.

FIELD OF THE INVENTION

The present invention proceeds from an apparatus for cooling metal stock rolled in a rolling mill,

- wherein the apparatus has a plurality of cooling devices to which water is fed via a respective spur conduit and by means of which the water is applied to the metal stock,
- wherein a valve sets the water stream flowing through the respective spur conduit and the valve is arranged in each of the spur conduits, and
- wherein a drive via which the respective valve is controlled is assigned to each of the valves.

PRIOR ART

Such an apparatus is known, for example, from WO 2018/080 669 A2, in which a single bypass conduit is arranged in parallel with the spur conduits. The bypass conduit is intended to avoid pressure shocks which could otherwise occur in the event of a rapid interruption of the volume flow through the spur conduits. The bypass conduit has to be opened and closed actively.

EP 2 767 353 A1 discloses a cooling section for flat stock, wherein the cooling section has a plurality of spray bars, each preceded by a valve.

BRIEF DESCRIPTION OF THE INVENTION

In the cooling section of a rolling mill, the rolled stock is cooled after rolling of metal stock. An exact temperature profile in the cooling section is usual in order to set the desired materials properties and keep them as constant as possible. There is a plurality of cooling devices, by which water is applied to at least one side of the stock. The cooling devices are installed along the transport direction of the stock. The cooling devices can, for example, be configured as cooling bars. The amount of water applied via the cooling devices is set using valves arranged upstream of the cooling devices. A problem can occur particularly when the valves are closed quickly. When the valves are being closed too quickly, pressure shocks, which in technical circles are also referred to as pressure pulses, often occur. To avoid excessive stresses, the switching-off time is therefore generally limited to 1 second. This applies even when the valves could be closed more quickly.

Pneumatic valves are generally used in the prior art. These can generally switch over no more quickly than 1 second. However, in some cases even shorter switching times of 0.6 seconds can be achieved.

A cooling section of a rolling mill, in which the cooling devices are switched using electrically actuated valves, is known from the above mentioned WO 2018/080 669 A2.

WO 2013/143 902 A1 likewise discloses an apparatus for cooling metal stock rolled in a rolling mill. In this apparatus, the cooling nozzles of the cooling section are connected via a feed conduit to a water reservoir. The supply of water to the cooling nozzles is controlled via a valve or a plurality of valves. A pressure vessel is arranged upstream of the valve or the valves in the flow direction of the water. The pressure vessel is filled partly with water and partly with air. In this configuration, pressure shocks, which could otherwise occur in the event of a rapid interruption of the volume flow through the spur conduits, can be avoided or at least reduced in intensity as a result of the buffer action of the pressure vessel.

It is known from the above noted WO 2013/143 902 A1 that a pressure vessel can be installed in the feed conduit to the cooling section. This pressure vessel serves mainly to keep the pressure constant in the supply conduit to the cooling section. But, to a certain extent, this also causes a reduction in pressure shocks. The pressure vessel there is designed for a volume of some cubic meters. A typical volume in the range from 10 to 20 cubic meters is specifically mentioned in WO 2013/143 902 A1.

SUMMARY OF THE INVENTION

It is an object of the present invention to provide an apparatus for cooling metal stock rolled in a rolling mill, which apparatus has superior operational properties.

According to the invention, an apparatus of the type mentioned above for cooling metal stock rolled in a rolling mill is configured

- so that the cooling devices form a plurality of groups each assigned a dedicated pressure vessel,
- so that the respective pressure vessel is connected at a respective connection position to a respective feed conduit via which the water is supplied to the spur conduits of the cooling devices of the corresponding group, and so that the respective connection position is arranged upstream, in the flow direction of the water, of the valves of the respective group of cooling devices.

The apparatus may be configured as a cooling section which is arranged downstream of the rolling mill. As an alternative, the apparatus may be configured as a group of intermediate stand cooling systems each arranged between two rolling stands of the rolling mill. In a particular case, the apparatus can also be arranged upstream of the rolling mill, for example when the apparatus is arranged between (at least) one preliminary stand and a multistand finishing line. Mixed forms are also possible.

The stock often consists of steel, and particular, it can be flat stock, i.e. a strip or a rough sheet. For flat stock, the cooling devices can, as alternatives, apply water to the flat stock only on the upper side, only on the underside or on both of the upper side and the underside.

The amount of water which is applied to the stock can be set individually for the cooling devices by means of their valves. It is possible for the groups of cooling devices to be "genuine" groups of cooling devices which each comprise more than one cooling device. In many cases, however, at least part of the groups of cooling devices in each case comprises only a single cooling device. In particular, it is even possible for each group to comprise only a single cooling device. In this case, the groups of cooling devices are degenerate by falling below a desirable level of performance.

The drives assigned to the valves can be configured as required. In particular, they can be configured as electric drives, for example as step motors.

The pressure vessel assigned to a respective group of cooling devices has a vessel volume. The vessel volume is preferably in the range from n×20 l to n×200 l, where n is the number of cooling devices of the respective group. The vessel volume is particularly preferably in the range from n×50 l to n×125 l.

A respective flow resistance is preferably arranged between the respective connection position and the respective pressure vessel. A device having the purpose of offering a resistance to the flow of water (=flow resistance) is thus present.

As mentioned above, a respective volume stream flows in the respective feed conduit if the valves of the cooling devices of the respective group are all fully opened. In this state, a respective conduit pressure prevails in the respective feed conduit in the region of the respective connection position. The respective flow resistance is preferably such that the respective volume stream, insofar as it overcomes the respective flow resistance, brings about a pressure drop which is at least 25% and not more than 75% of the respective conduit pressure, in particular about half of the respective conduit pressure. However, small deviations are acceptable.

BRIEF DESCRIPTION OF THE DRAWINGS

The above-described properties, features and advantages of the present invention and also the way in which these are achieved will become clearer and more easily understood in connection with the following description of the working examples which are explained in more detail in conjunction with the drawings. Here, the drawings schematically depict.

DESCRIPTION OF THE EMBODIMENTS

Figure 1:
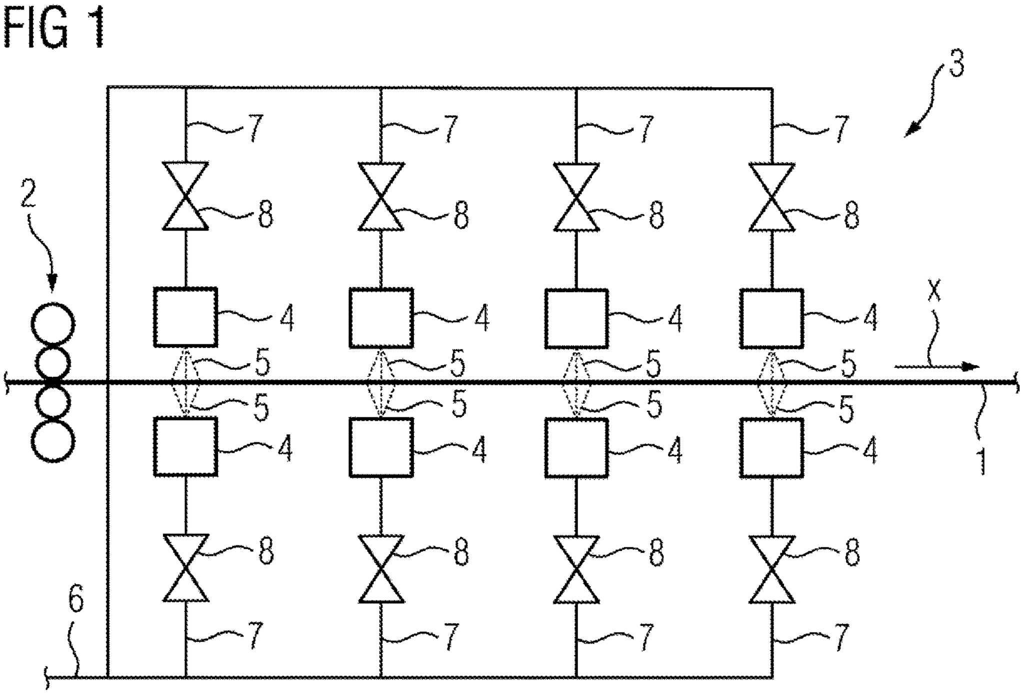
FIG. 1 a rolling stand and a cooling section.

In FIG. 1, stock 1 is rolled in a rolling mill. Only the last rolling stand 2 of a multistand rolling mill is depicted in FIG. 1. The stock 1 is often a flat stock, i.e. a strip or a rough sheet. However, the stock 1 can also have a different format. For example, it can be a profile or a bar-shaped stock 1. The stock 1 often consists of steel, sometimes of aluminum and in rare cases of a different metal or a corresponding alloy.

A cooling section 3 follows the rolling mill. The stock 1 is cooled in the cooling section 3. The cooling section 3 is thus an apparatus for cooling the metal stock 1 rolled in the rolling mill. The present invention will be explained in conjunction with the cooling section 3 depicted in FIG. 1, which cooling section follows the rolling mill. The term "cooling section" is thus used in the sense of the apparatus mentioned. However, the present invention can also be realized when the apparatus is arranged within the rolling mill, i.e. between the rolling stands 2 of the multistand rolling mill. Furthermore, it can also be realized when the apparatus is installed upstream of the rolling mill.

Figure 2:
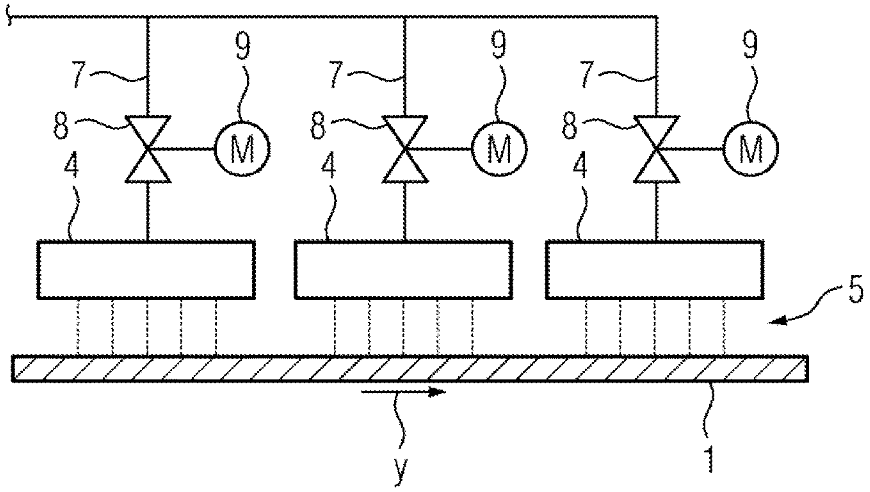
PRIOR ART FIG 2
FIG. 2 part of a cooling section.

The cooling section 3 in FIG. 1 has a plurality of cooling devices 4. Water 5 is applied to the stock 1 by the cooling devices 4. The cooling devices 4 are generally configured as spray bars which apply the water 5 to the stock 1 over the entire width of the stock 1 (FIG. 2). The water 5 in its totality is fed to the cooling section 3 via a supply conduit 6. Within the cooling section 3, the water 5 is distributed until it enters spur conduit 7 via which the water 5 is fed to the respective cooling device 4. One (1) valve 8, which sets the amount of water 5 fed to the respective cooling device 4 per unit of time, is arranged in each of the spur conduits 7. There is thus a 1:1 assignment of cooling devices 4, spur conduits 7 and valves 8. The amount of water 5 which is fed per unit time to the respective cooling device 4 represents a respective water flow.

A total of eight cooling devices 4 are depicted in FIG. 1, with part of the cooling devices 4 applying the water 5 from above to the stock 1 and a further part of the cooling devices 4 applying the water 5 from below to the stock 1 in the depiction of FIG. 1. Furthermore, the cooling devices 4 are staggered one after the other in the transport direction x of the stock 1. However, these situations are purely illustrative. Thus, more or less than eight cooling devices 4 can also easily be present. It is also possible for the water 5 to be applied exclusively from above or exclusively from below to the stock 1 by means of the cooling devices 4. When the stock 1 is flat stock, it is also possible for a plurality of cooling devices 4 to be arranged next to one another in the width direction y of the stock 1, as depicted in FIG. 2. It is critical that the respective valve 8 by means of which the water stream flowing through the respective spur conduit 7 can be set is arranged in the respective spur conduit 7.

A drive 9 is assigned as an actuating device to each of the valves 8. In the depiction in FIG. 2, the drives 9 are configured as electric drives. The respective valve 8 is controlled by the respective drive 9. This is also the case for the valves 8 of FIG. 1. However, this is not shown in FIG. 1 in order not to overload FIG. 1. Due to the design of the actuating devices as electric drives, switching times of significantly less than 1 second, for example 0.2 second or below, can be realized for the valves 8. Furthermore, electric drives can be set precisely very quickly. This makes both rapid and precise setting of a respective valve position possible.

The electric drives can, for example, be configured as step motors. Step motors can be moved through 90° without problems in a time of less than 0.2 second. This angle corresponds to the angle of rotation of a conventional valve 8 between the completely closed position and the completely open position. The respective valve 8 can thus be changed from the completely closed position into the fully open position and vice versa in a time of 0.2 second and less. Furthermore, the adjustment in the case of a step motor usually occurs in angled steps which are (mechanically) significantly below 1°, for example 0.1° (or a similarly small angle). In this case, it is possible to change the respective valve 8 between the completely closed position and the fully open position in steps of 0.1° (or a similarly small angle). Furthermore, the control electronics of an electric drive is sufficiently simple and inexpensive. Wear and risk of failure are much lower than in the case of a pneumatic drive. The required encapsulation for protection against spray water and the like (for example of the protection type IP 65) can easily be realized. This applies both to the respective electric drive itself and also to the control electronics for the drive.

Figure 3:
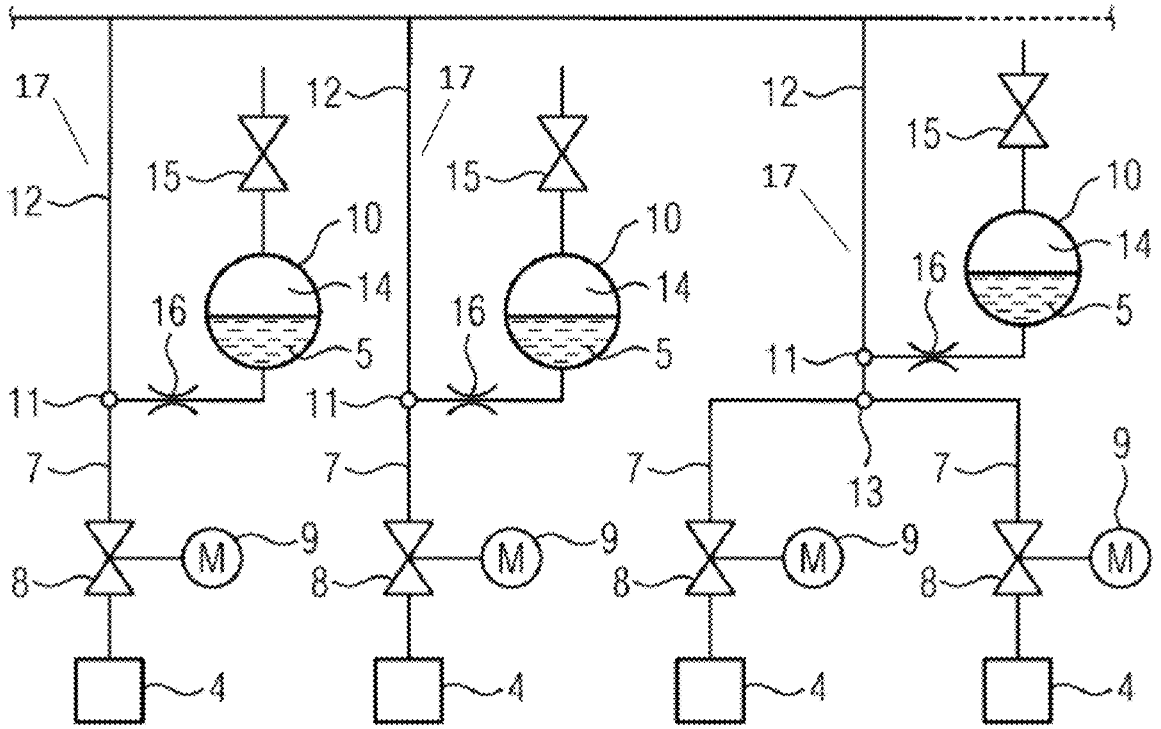
FIG. 3 a cooling section.

Regardless of the specific geometric arrangement of the cooling devices 4, the cooling devices 4 as depicted in FIG. 3 continue to form a plurality of groups. A dedicated pressure vessel 10 is assigned to each of the groups. The expression "assigned to a dedicated" is intended to mean that the respective pressure vessel 10 acts in conjunction only with the cooling devices 4 of the respective group. In particular, the respective pressure vessel 10 is connected at a respective connection position 11 to a respective feed conduit 12. Water 5 is supplied via the respective feed conduit 12 to the spur conduits 7 of the cooling devices 4 of the respective group. In the flow direction of the water 5, the respective connection position 11 is thus located upstream of the valves 8 of the respective group of cooling devices 4. On the other hand, the water 5 is not conveyed via the respective feed conduit 12 to the spur conduit 7 of other cooling devices 4. The respective connection position 11 is thus not located upstream, in the flow direction of the water 5, of the valves 8 of other groups of cooling devices 4. The pressure vessel 10 thus defines the respective group of cooling devices 4: all cooling devices 4 whose water 5 flows via the respective connection position 11 form one (1) group of cooling devices 4. All other cooling devices 4 do not belong to this group.

The respective connection position 11 for the respective pressure vessel 10 should be arranged as close as possible to the valves 8 of the respective group. When, as on the left-hand side of FIG. 3, the respective group of cooling devices 4 comprises only a single cooling device 4, the respective connection position 11 should thus be as close as possible to the valve 8 of this cooling device 4. When, as at the right-hand side of FIG. 3, the respective group of cooling devices 4 comprises a plurality of cooling devices 4, the respective connection position 11 should be arranged as close as possible to a distributor point 13 at which the feed conduit 12 branches for the first time to the cooling devices 4 of the respective group.

FIG. 3 shows a plurality of coolant suppliers 17 each with a cooling device 4. In the depiction in FIG. 3, part of the groups of cooling devices 4 in each case comprises only a single cooling device 4. This is specifically the case for the two cooling devices 4 shown at left in FIG. 3. In these cases, the respective feed conduit 12 is identical to the respective spur conduit 7. As an alternative, it is likewise possible for the groups of cooling devices 4 each to comprise a plurality of cooling devices 4. This is specifically the case for the two cooling devices 4 shown at right in FIG. 3. In these cases, the respective feed conduit 12 is located upstream of the respective spur conduits 7.

A definitive criterion for the arrangement of the pressure vessels 10 is the amount of water 5 which is present between the respective connection position 11 and the respective valves 8 or, in the case of a single downstream valve 8, the respective valve 8. This is because this amount of water cannot be diverted into the corresponding pressure vessel 10. This amount thus has to be directly and quickly stopped before the respective valves 8 when these valves 8 are closed quickly. In general, this is not critical when the distances of the respective valves 8 from the respective pressure vessel 10 is small enough, for example 10 m or less, in particular less than 5 m. This is intended to be made clear by an example involving a single valve 8.

It is assumed that the flow velocity of the water 5 in the corresponding spur conduit 7 is 3 m/s. The respective valve 8 is closed completely within 0.2 second. The water 5 then has to be slowed from 3 m/s to 0 m/s within 0.2 second. This involves an average acceleration of 15 $m/s^2$, i.e. approximately 1.5 times the acceleration due to gravity. Furthermore, it is known that a 10 m high column of water generates a pressure of 1 bar. The same applies to a 10 m long column of water which is stopped at the acceleration due to gravity. It is further assumed that the distance from the respective connection position 11 to the respective valve 8 is 5 m. In this case, it is not necessary to stop a 10 m long column of water at 1.0 times the acceleration due to gravity, but instead a 5 m long column of water at 1.5 times the acceleration due to gravity. Thus, this column of water generates a pressure of 0.75 bar under the prevailing operating conditions on slowing from 3.0 m/s to 0 m/s in 0.2 second.

In the absence of the pressure vessels 10, on the other hand, rapid closure of a respective valve 8 would lead to a pressure shock since in this case the water 5 flowing in the feed conduit 12 would also have to be stopped if it is present upstream, in the flow direction of the water 5, of the respective connection position 11. However, such pressure shocks can be significantly alleviated by the pressure vessels 10 since in this case the water 5 flowing in the respective feed conduit 12 is diverted into the dedicated pressure vessel 10 assigned to the respective group of cooling devices 4.

As is generally known, pressure vessels 10 serve to equalize the water management. They should therefore be able, if required, to accommodate water 5 from the feed conduit 12 to which they are connected in the event of a rapid reduction in the water requirement and secondly be able to feed water 5 back into the feed conduit 12 in the case of a sudden increase in the water requirement. For the pressure vessels 10 to be able to accommodate and return this water 5, the pressure vessels 10 are, in the depiction in FIG. 3, each partly filled with water 5 and partly filled with air 14 during operation. In general, a fill level F of water 5 (see FIG. 4) of about 50% should be sought. However, some deviations, for example in the range from 40% to 60%, are quite possible. The pressure vessels 10 are thus designed to be partly filled with water 5 and partly with air 14 during operation.

To be able to set the respective fill level F, the pressure vessels 10 can, for example, have a respective air valve 15. Via the respective air valve 15, air 14 can be introduced into the respective pressure vessels 10 or air 14 can be discharged from the respective pressure vessel 10. In the simplest case, the respective air valve 15 is a manually operated nonreturn valve (for example like the valve of a bicycle or another road vehicle having pneumatic tires). In this case, the respective pressure vessel 10 preferably has a fill level indicator and/or a pressure indicator. The fill level indicator can, for example, be a simple sight glass, and the pressure indicator can be a conventional pressure gage. As an alternative or in addition, the respective air valve 15 can be able to be controlled by a control device (not shown) of the cooling section 3. In this case, the respective air valve 15 is preferably divided into two valve paths, with one of the two valve paths being connected with a compressed air supply for introducing additional air 14 into the respective pressure vessel 10 and the other of the two valve paths having an outlet to the surroundings for letting air 14 out of the respective pressure vessel 10. Furthermore, the respective fill level F and/or the pressure prevailing in the respective pressure vessel 10 are in this case preferably measured by instrumentation and transmitted to the abovementioned control device.

Figure 4:
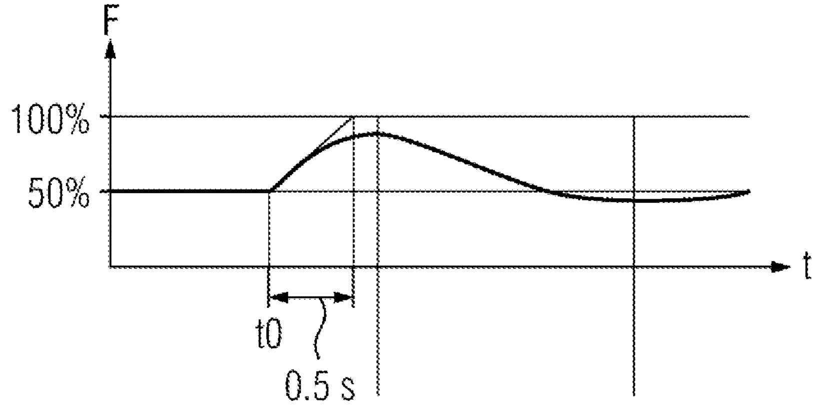
FIG. 4 a time profile of a fill level.
Figure 5:
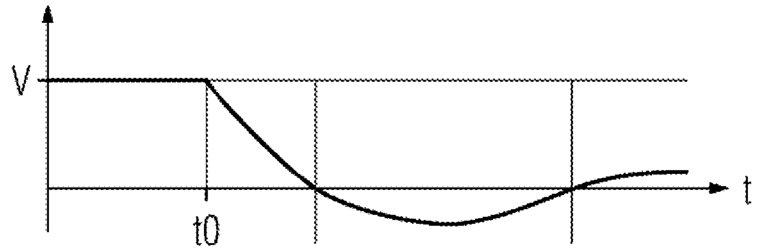
FIG. 5 a time profile of a volume stream.
Figure 6:
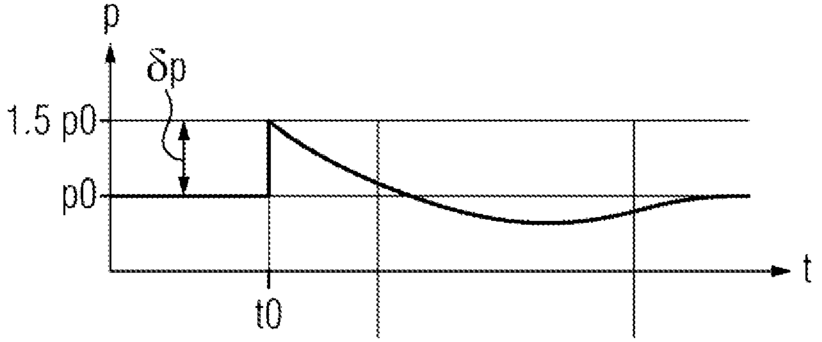
FIG. 6 a time profile of a pressure.

The water moving in the respective feed conduit 12 is thus slowed gently by the respective pressure vessel 10. Due to the fact that the groups of cooling devices 4 are generally relatively small, usually not more than from six to ten cooling devices 4, the pressure vessels 10 can also be made relatively small. This is explained below in conjunction with FIG. 4 to 6 showing an embodiment in which the respective group of cooling devices 4 comprises only a single cooling device 4. However, the associated explanations also apply when the respective group of cooling devices 4 comprises a plurality of cooling devices 4. In this case, the explanations below have to be modified so as to assume uniform operation of the valves 8 of the respective group.

When the respective valve 8 is fully open, a respective volume flow V of water 5, for example 100 liters per second, travels in the respective feed conduit 12, which in the case of a group having a single cooling device 4 is identical to the spur conduit 7. This state is shown at left in FIG. 5. The fill level F is initially about 50% in the depiction in FIG. 4. The respective pressure vessel 10 is thus filled to an approximately equal extent with water 5 and air 14.

At a particular point in time t0, the corresponding valve 8 is moved from the fully open position into the completely closed position. The movement from the fully open position into the completely closed position is carried out as quickly as possible, for example in a time of 0.1 second or 0.2 second. In order to be able to explain the dimensioning of the respective pressure vessel 10 better, it will be assumed in the following that the closure of the corresponding valve 8 occurs completely abruptly, so that the time required for closure can be disregarded.

If the respective pressure vessel 10 were not present, a high pressure shock would occur on closure of the respective valve 8 since the respective volume flow V travelling in the respective feed conduit 12 would have to be decreased abruptly to zero. However, owing to the respective pressure vessel 10, the respective volume flow V can be diverted into the respective pressure vessel 10. In this way, the respective pressure vessel 10 is filled to beyond its previous fill level F. As a result of the filling of the respective pressure vessel 10, the air 14 present in the respective pressure vessel is compressed, so that the air pressure there is increased. The increased air pressure provides an increasing resistance to further introduction of water 5 into the respective pressure vessel. The respective fill level F therefore does initially increase after the point in time t0, but then attains a maximum and subsequently decreases again. A slight, usually substantially damped, oscillation may occur. This can be seen most readily from the change in sign of the volume flow in FIG. 5. The maximum fill level F is usually attained within 1 second, sometimes even within a shorter time of, for example, only 0.5 second.

At the point in time t0 itself, i.e. at the beginning of slowing of the flow, the entire respective volume flow V has to be accommodated, as indicated in the depiction in FIG. 4. If the respective volume flow V were to be maintained unchanged, the respective pressure vessel 10 would be completely filled after, for example, 0.5 second from the point in time t0, as indicated in FIG. 4. 50% of the volume of the respective pressure vessel 10 would thus flow into the respective pressure vessel 10 in 0.5 second. Accordingly, 100% of the volume of the respective pressure vessel 10 would flow into the respective pressure vessel 10 in 1 second. As can be seen from the depiction in FIG. 4, the ratio of the respective vessel volume (unit: liter or cubic meter) and the respective volume flow V (unit: liters/second or cubic meters/second) is thus 1 second. Nevertheless, certain deviations from this value (1 second) are possible. However, the abovementioned ratio should be in the range from 0.2 second to 2.0 seconds. In practice, this corresponds to a volume of from 20 l to 200 l, usually in the range from 50 l to 125 l, in particular about 100 l, in the case of a single cooling device 4. If the group comprises a plurality of cooling devices 4, the volume values mentioned have to be scaled accordingly.

Owing to the resistance offered by, calculated from the respective connection position 11, the respective spur conduit 7 and the respective cooling device 4, a respective conduit pressure p0 prevails in the region of the respective connection position 11 in the state initially assumed in FIGS. 4 and 5, i.e. when the corresponding valve 8 is in the fully open position. The respective conduit pressure p at this time thus has the value p0. This is shown at left in FIG. 6. Since an equilibrium state prevails before the point in time t0, the air 14 in the respective pressure vessel 10 is likewise under the pressure p0. At the point in time t0, i.e. at the point in time of closure of the respective valve 8, the entire volume flow V travelling in the respective feed conduit 12 firstly has to be diverted into the respective pressure vessel 10. The volume flow V through the feed conduit 12 brings about a pressure drop 5*p*, measured at the respective connection position 11 and shown in FIG. 5, at a respective flow resistance 16 located between the respective connection position 11 and the respective pressure vessel 10 on its way from the respective connection position 11 to the respective pressure vessel 10. The pressure drop 5*p* is preferably at least half the respective conduit pressure p0. Accordingly, the respective conduit pressure p has to increase abruptly to a value corresponding approximately to from 1.4 times to 1.6 times the value p0, i.e. approximately 1.5 times. In absolute values, the pressure drop 5*p* is in practice usually in the order of 1 bar. The respective conduit pressure p then decreases again.

The respective flow resistance 16 can be set by appropriate dimensioning of the respective connecting conduit between the respective connection position 11 and the respective pressure vessel 10, in particular by dimensioning of the cross section of the total respective connecting conduit or the cross section of a section of the respective connecting conduit. An oscillation tendency, in particular, is suppressed and damped by suitable dimensioning of the flow resistance 16.

The present invention has many advantages. In particular, pressure shocks can be avoided even when the valves 8 are switched very quickly (with switching times far below 1 s). The influence of the pressure vessels 10 on the amount of water actually fed to the cooling devices 4 can be taken into account using an appropriate model of the cooling section 3 or be equalized in a simple way by basic automation of the cooling section 3. Furthermore, pressure oscillations within the hydrodynamic system (consisting of the supply conduit 6, the feed conduits 12 and the spur conduits 7) are reduced by the pressure vessels 10. This simplifies the control of pumps that convey the water 5. This applies particularly when pressure measurements are employed for regulating the pumps. Furthermore, pressure decreases on opening of valves 8 are also reduced, since in this case water 5 is fed from the pressure vessels 10 into the corresponding feed conduits 12. The configuration of the drives 9 as electric drives makes reliable and fast actuation of the valves 8 possible in a simple way.

Although the invention has been illustrated and described in detail by the preferred working example, the invention is not restricted by the examples disclosed and other variants can be derived therefrom by a person skilled in the art without going outside the scope of protection of the invention.

LIST OF REFERENCE SYMBOLS

1 Metal stock being rolled
2 Rolling stand
3 Cooling section
4 Cooling devices
5 Water

6 Supply conduit
7 Spur conduits
8 Valves
9 Electric drives
10 Pressure vessels
11 Connection positions
12 Feed conduits
13 Distributor point
14 Air
15 Air valves
16 Flow resistance
F Fill level
p, p0 Conduit pressure
t0 Point in time
V Volume flow
x Transport direction
y Width direction
δp Pressure drop

The invention claimed is:

1. An apparatus for cooling metal stock rolled in a rolling mill, comprising:

- a plurality of coolant suppliers, each coolant supplier comprising,
- a cooling device;
- a spur conduit connected to the cooling device to supply water to the cooling device;
- a valve arranged in the spur conduit to set flow of the water therethrough, the valve having an angle of rotation of 90° between the valve's completely open position and completely closed position;
- a step motor that moves the valve from the completely open position to the completely closed position in less than 0.2 second;
- a feed conduit which supplies the water to the spur conduit;
- a dedicated pressure vessel; and
- a flow resistance conduit arranged between a connection position and the dedicated pressure vessel, the flow resistance conduit being set to provide a flow resistance,
- wherein the feed conduit, the spur conduit, and the flow resistance conduit are connected to the connection position,
- the spur conduit is arranged downstream of the connection position,
- the flow resistance conduit and the feed conduit are arranged upstream of the connection position,
- the flow resistance conduit is arranged downstream of the dedicated pressure vessel, and
- the flow resistance conduit has a cross-section dimensioned to dampen oscillation in the water flow once the valve's position is changed from the completely open position to the completely closed position.

2. The apparatus as claimed in claim 1, wherein the dedicated pressure vessel in at least one of the coolant suppliers is connected to an additional cooling device, and wherein the dedicated pressure vessel of the at least one of the coolant suppliers has a vessel volume in the range from n×20 l to n×200 l, where n is the number of cooling devices to the dedicated pressure vessel in the at least one coolant supplier.

3. The apparatus as claimed in claim 1, wherein at least one of the coolant suppliers further comprises at least one more cooling device connected to the connection position of the at least one of the coolant suppliers via another valve.

4. The apparatus as claimed in claim 1, wherein the dedicated pressure vessel of each coolant supplier comprises an air valve that sets an air pressure therein.

5. An apparatus for cooling metal stock rolled in a rolling mill, comprising:

- a plurality of coolant suppliers, each coolant supplier comprising,
- a cooling device;
- a spur conduit connected to the cooling device to supply water to the cooling device;
- a valve arranged in the spur conduit to set flow of the water therethrough, the valve having an angle of rotation of 90° between the valve's completely open position and completely closed position;
- a step motor that moves the valve from the completely open position to the completely closed position in less than 0.2 second;
- a feed conduit which supplies the water to the spur conduit;
- a dedicated pressure vessel; and
- a flow resistance conduit arranged between a connection position and the dedicated pressure vessel, the flow resistance conduit being set to provide a flow resistance,
- wherein the feed conduit, the spur conduit, and the flow resistance conduit are connected to the connection position,
- the spur conduit is arranged downstream of the connection position,
- the flow resistance conduit and the feed conduit are arranged upstream of the connection position,
- the flow resistance conduit is arranged downstream of the dedicated pressure vessel,
- the flow resistance conduit has a cross-section dimensioned to dampen oscillation in the water flow, and
- at least one of the coolant suppliers further comprises at least one more cooling device connected to the connection position of the at least one of the coolant suppliers via another valve.

* * * * *